(12) United States Patent
Bobis et al.

(10) Patent No.: US 11,222,365 B2
(45) Date of Patent: Jan. 11, 2022

(54) AUGMENTED REALITY AND MOBILE TECHNOLOGY BASED SERVICES PROCUREMENT AND DISTRIBUTION

(71) Applicant: ACCENTURE GLOBAL SOLUTIONS LIMITED, Dublin (IE)

(72) Inventors: Jan Bobis, Marikina (PH); Norwin T. Avila, Mandaluyong (PH); Richard M. Infantado, Quezon (PH); Alvin F. Bado, Cainta Rizal (PH); Eldon Ivan A. Leuterio, Caloocan (PH)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 221 days.

(21) Appl. No.: 16/040,060

(22) Filed: Jul. 19, 2018

(65) Prior Publication Data

US 2019/0026785 A1    Jan. 24, 2019

Related U.S. Application Data

(60) Provisional application No. 62/535,694, filed on Jul. 21, 2017.

(51) Int. Cl.
*G06Q 30/00* (2012.01)
*G06Q 30/02* (2012.01)
*G06T 19/00* (2011.01)

(52) U.S. Cl.
CPC ..... *G06Q 30/0271* (2013.01); *G06Q 30/0224* (2013.01); *G06Q 30/0259* (2013.01);
(Continued)

(58) Field of Classification Search
None
See application file for complete search history.

(56) References Cited

U.S. PATENT DOCUMENTS 5,848,396 A * 12/1998 Gerace ............... G06Q 30/0201
                                                    705/7.33
7,043,433 B2 * 5/2006 Hejna, Jr. ................ G09B 5/00
                                                    704/270
(Continued)

FOREIGN PATENT DOCUMENTS

JP     2016143412 A  *  8/2016  ......... G06Q 30/0236
WO  WO-2010085616 A2 *  7/2010  ............. G06Q 30/02

OTHER PUBLICATIONS

DFFFEACC. Loyalty and Fidelity Discounts and Rebates. (Feb. 4, 2003). Retrieved online Mar. 4, 2021. https://www.oecd.org/daf/competition/abuse/2493106.pdf (Year: 2003).*

(Continued)

*Primary Examiner* — James A Reagan
(74) *Attorney, Agent, or Firm* — Mannava & Kang, P.C.

(57) ABSTRACT

In some examples, augmented reality and mobile technology based services procurement and distribution may include ascertaining an attribute and a location associated with a user. Augmented reality and mobile technology based services procurement and distribution may include generating, based on the ascertained attribute and location, a plurality of offers for services on a map display or an augmented reality display, and generating, based on selection of an offer, a display of the selected offer that includes a QR code, a barcode, and/or a Near Field Communication code. Augmented reality and mobile technology based services procurement and distribution may include analyzing, based on redeeming of the selected offer, the attribute associated with user relative to attributes of other users, and modifying the generation, based on the analysis of the attribute associated with user relative to attributes of other users and the location, of the plurality of offers for the services.

14 Claims, 10 Drawing Sheets

(52) U.S. Cl.
CPC ....... *G06Q 30/0261* (2013.01); *G06T 19/003* (2013.01); *G06T 19/006* (2013.01)

(56) References Cited

U.S. PATENT DOCUMENTS

| | | | | |
|---|---|---|---|---|
| 8,285,643 | B2* | 10/2012 | Isaacson | G06Q 20/105 |
| | | | | 705/41 |
| 10,121,127 | B1* | 11/2018 | Isaacson | G06Q 30/0605 |
| 2007/0124288 | A1* | 5/2007 | Swanson | G06F 16/951 |
| 2012/0290950 | A1* | 11/2012 | Rapaport | H04N 21/8358 |
| | | | | 715/753 |
| 2014/0129314 | A1* | 5/2014 | Kim | G06Q 30/0233 |
| | | | | 705/14.33 |
| 2014/0136105 | A1* | 5/2014 | Chakraborty | G06Q 50/00 |
| | | | | 701/521 |
| 2015/0050990 | A1* | 2/2015 | Colvin | G07F 17/3241 |
| | | | | 463/25 |
| 2015/0100405 | A1* | 4/2015 | Lee | G06Q 30/0267 |
| | | | | 705/14.39 |
| 2015/0112774 | A1* | 4/2015 | Georgoff | G06Q 30/0207 |
| | | | | 705/14.1 |
| 2016/0055536 | A1* | 2/2016 | Gupta | G06Q 30/0261 |
| | | | | 705/14.58 |
| 2016/0063529 | A1* | 3/2016 | Roeding | H04W 4/20 |
| | | | | 705/14.13 |
| 2016/0171509 | A1* | 6/2016 | Fanous | G06F 16/955 |
| | | | | 705/7.29 |
| 2016/0203522 | A1* | 7/2016 | Shiffert | G06Q 30/0267 |
| | | | | 705/14.58 |
| 2016/0361599 | A1* | 12/2016 | McKirdy | G06Q 30/0271 |
| 2018/0089709 | A1* | 3/2018 | Rousseau-Villella | |
| | | | | G06F 16/9535 |
| 2018/0276710 | A1* | 9/2018 | Tietzen | G06N 20/00 |

OTHER PUBLICATIONS

Donetta Kay Poisson. Effectiveness of Coupons on the Decision to Purchase in the Full Service Dining Segment of the Restaurant Industry. (May 2007). Retrieved online Jun. 28, 2019. https://trace.tennessee.edu/cgi/viewcontent.cgi?article=5955&context=utk_gradthes (Year: 2007).*

* cited by examiner

AUGMENTED REALITY AND MOBILE TECHNOLOGY BASED SERVICES PROCUREMENT AND DISTRIBUTION

PRIORITY

This application is a Non-Provisional Application of commonly assigned and Provisional Application Ser. No. 62/535,694, filed Jul. 21, 2017, the disclosure of which is hereby incorporated by reference in its entirety.

BACKGROUND

In the services industry, a merchant may offer incentives in the form of coupons, points, perks, etc., to customers in an attempt to have the merchant's services purchased. For example, a merchant may offer a coupon that provides a potential customer with a monetary discount for purchase of the merchant's services within a specified time period. The merchant may also offer points that may be accumulated based on repeat purchases, and redeemed once a sufficient number of points are accumulated. With respect to perks, the merchant may offer, for example, free or discounted tours, dinners, etc., to certain customers who meet a criterion specified by the merchant.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
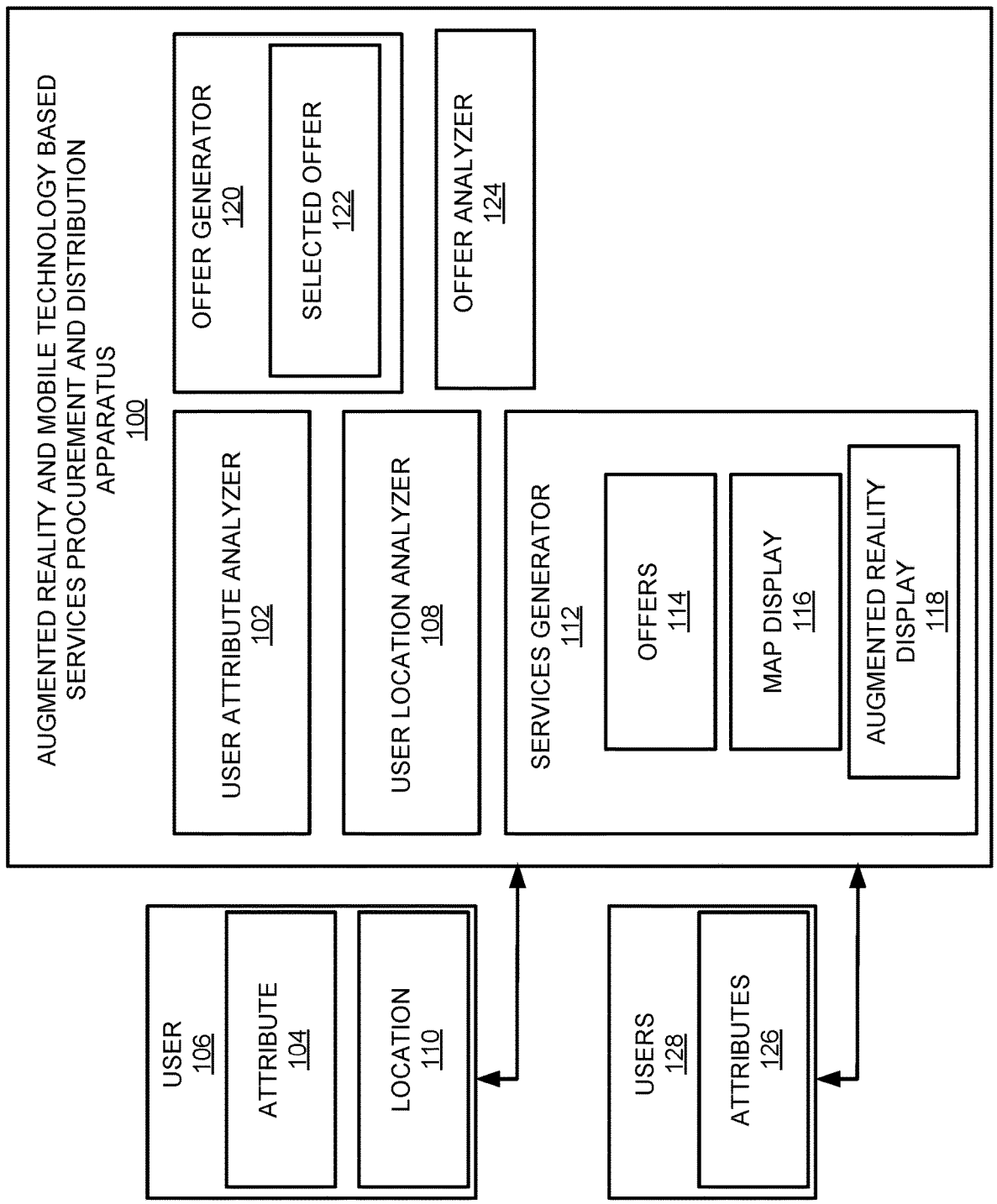
FIG. 1 illustrates a layout of an augmented reality and mobile technology based services procurement and distribution apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Augmented reality and mobile technology based services procurement and distribution apparatuses, methods for augmented reality and mobile technology based services procurement and distribution, and non-transitory computer readable media having stored thereon machine readable instructions to provide augmented reality and mobile technology based services procurement and distribution are disclosed herein. The apparatuses, methods, and non-transitory computer readable media disclosed herein provide for ascertaining an attribute associated with a user, and ascertaining a location associated with the user. The apparatuses, methods, and non-transitory computer readable media disclosed herein provide for generating, based on the ascertained attribute and location, a plurality of offers for services on a map display or an augmented reality display, and generating, based on selection of an offer from the plurality of offers, a display of the selected offer that includes a QR code, a barcode, and/or a Near Field Communication code. The apparatuses, methods, and non-transitory computer readable media disclosed herein provide for analyzing, based on redeeming of the selected offer, the attribute associated with user relative to attributes of other users, and modifying the generation, based on the analysis of the attribute associated with user relative to attributes of other users and the location, of the plurality of offers for the services on the map display or the augmented reality display.

The apparatuses, methods, and non-transitory computer readable media disclosed herein may encompass applications for commerce, advertising, banking, education, health, etc. The apparatuses, methods, and non-transitory computer readable media disclosed herein may facilitate interaction of an organization with clients by providing services, promotions, and other client-centered, and customer specific needs using augmented reality, and mobile technology. The apparatuses, methods, and non-transitory computer readable media disclosed herein may also provide predictive analytics and machine learning to a wide array of industries such as banking, insurance, media, etc.

The apparatuses, methods, and non-transitory computer readable media disclosed herein may also include gamification. In this regard, as a user redeems offers and accumulates points, the user may be presented with different types of offers and incentives based on the number of accumulated points. For example, when a user accumulates more than a threshold number of points, the user may be presented with higher level offers that include a higher level of discount compared to a user with a lower number of accumulated points. According to another example, the user may "catch" offers as they are presented for a specified amount of time (e.g., 10 seconds). For example, points and levels may be predetermined (e.g., configurable), where, according to an example, a silver level may be specified as 10,000 points, a gold level may be specified as 20,000 points, etc. In this regard, a merchant may choose to have a specific offer or promotion in addition to offers being based on user attributes when deploying or dropping an offer or promotion in a map. Alternatively or additionally, special offers or promotions may be provided to users who are active on a platform to maintain the gamification in an active status (e.g., a free island tour offer but for gold level members only).

With respect to offers that are accepted (e.g., selected) by a user, for the apparatuses, methods, and non-transitory computer readable media disclosed herein may, the selected offers may represent a contract between the user and the service provider (e.g., a merchant) for the offer. Thus, once a user selects an offer, the selection may represent a contract for a specified amount of time within which the user may redeem the offer.

The apparatuses, methods, and non-transitory computer readable media disclosed herein may provide incentives for the service provider (e.g., a merchant) to register to offer services. In this regard, a predetermined number of users may be linked (upon authorization) to a new service provider, and the predetermined number of users may be given offers with high incentives for the new service provider. In this manner, a new service provider may potentially gain several new users in a relatively short period of time.

The apparatuses, methods, and non-transitory computer readable media disclosed herein may provide data analytics with respect to users, types of services being offered, selected, and redeemed, user attributes such as demographics, gender, etc. In this regard, as disclosed herein, according to an example, the data analytics may be used to modify the generation, based on the analysis of the attribute associated with user relative to attributes of other users and the location, of the plurality of offers for the services on the map display or the augmented reality display.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example augmented reality and mobile technology based services procurement and distribution apparatus (hereinafter also referred to as "apparatus 100").

Referring to FIG. 1, the apparatus 100 may include a user attribute analyzer 102 that is executed by at least one hardware processor (e.g., the hardware processor 702 of FIG. 7, and/or the hardware processor 904 of FIG. 9) to ascertain an attribute 104 associated with a user 106.

A user location analyzer 108 that is executed by at least one hardware processor (e.g., the hardware processor 702 of FIG. 7, and/or the hardware processor 904 of FIG. 9) is to ascertain a location 110 associated with the user 106.

A services generator 112 that is executed by at least one hardware processor (e.g., the hardware processor 702 of FIG. 7, and/or the hardware processor 904 of FIG. 9) is to generate, based on the ascertained attribute 104 and location 110, a plurality of offers 114 for services on a map display 116 or an augmented reality display 118.

According to examples disclosed herein, the attribute associated with the user may include an offer status level of the user from a plurality of offer status levels related to selection and/or redemption of offers. For example, the plurality of offer status levels may include a silver offer status level, a gold offer status level, a platinum offer status level, etc. In this regard, the services generator 112 may generate, based on the ascertained attribute and location, the plurality of offers for services on the map display or the augmented reality display by determining, based on the offer status level of the user, a particular offer for the user, and generating, based on the ascertained attribute and location, the plurality of offers for services, including the particular offer, on the map display or the augmented reality display. For example, assuming that the user includes a silver offer status level, the particular offer may include a two day cruise, whereas if there user included a gold offer status level, the particular offer may include a five day cruise, etc. In this regard, the particular offer for the cruise may be generated in addition to the plurality of offers for services, and may be based solely on the offer status level associated with the user. That is, if the user does not include any offer status level, the only offers generated for the user may include the plurality of offers for services, excluding the particular offer as disclosed herein.

According to examples disclosed herein, the attribute associated with the user may include a number of offer status level points associated with the user. In this regard, the services generator 112 may generate, based on the ascertained attribute and location, the plurality of offers for services on the map display or the augmented reality display by comparing, for each offer status level of a plurality of offer status levels, the number of offer status level points associated with the user to offer status point thresholds associated with respective ones of the plurality of offer status levels. For example, the number of offer status level points associated with the user may include 5000 points, which may be compared to offer status point thresholds of 4000 points, 8000 points, 12,000 points, etc., associated with silver, gold, platinum, etc., offer status levels. The services generator 112 may identify, based on the comparison of the number of offer status level points associated with the user to offer status point thresholds associated with respective ones of the plurality of offer status levels related to selection and/or redemption of offers, an offer status level associated with the user. For example, for the user that includes 5000 offer status level points, the gold offer status level may be associated with the user. The services generator 112 may determine, based on the offer status level associated with the user, a particular offer for the user. Further, the services generator 112 may generate, based on the ascertained attribute and location, the plurality of offers for services, including the particular offer, on the map display or the augmented reality display.

According to examples disclosed herein, the attribute associated with the user may include an activity level of the user from a plurality of activity levels related to selection and/or redemption of offers within a specified time duration. For example, the plurality of activity levels may include a low activity level, a medium activity level, a high activity level, etc., which may be related to selection and/or redemption of offers within specified time durations of five minutes, two minutes, one minute, etc. In this regard, the services generator 112 may generate, based on the ascertained attribute and location, the plurality of offers for services on the map display or the augmented reality display by determining, based on the activity level of the user, a particular offer for the user. For example, a particular offer related to a low activity level may include a two day vacation, a particular offer a level related to a medium actively level may include a four-day vacation, a particular offer level related to a high actively level may include a seven day vacation, etc. Further, the services generator 112 may generate, based on the ascertained attribute and location, the plurality of offers for services, including the particular offer, on the map display or the augmented reality display.

According to examples disclosed herein, the attribute associated with the user may include an activity level of the user from a plurality of activity levels related to selection and/or redemption of offers within a specified time duration. In this regard, the services generator 112 may generate, based on the ascertained attribute and location, the plurality of offers for services on the map display or the augmented reality display by comparing, for each activity level of the plurality of activity levels, an activity time duration associated with the user to activity time duration thresholds associated with respective ones of the plurality of activity levels. For example, an activity time duration associated with the user may include three minutes with respect to selection and/or redemption of offers, whereas activity time duration thresholds associated with a low activity level, a medium actively level, a high activity level, etc., may include six minutes, four minutes, two minutes, etc. The services generator 112 may identify, based on the comparison of the activity time duration associated with the user to activity time duration thresholds associated with respective ones of the plurality of activity levels, the activity level associated with the user. The services generator 112 may determine, based on the activity level associated with the user, a particular offer for the user. The services generator 112 may generate, based on the ascertained attribute and location, the plurality of offers for services, including the particular offer, on the map display or the augmented reality display.

According to examples disclosed herein, the services generator 112 may generate, based on the ascertained attribute and location, the plurality of offers for services on the map display or the augmented reality display by ascertaining, relative to the location associated with the user, an offer coverage radius, and generating, based on the ascertained attribute and location, the plurality of offers for services within an area defined by the offer coverage radius on the map display or the augmented reality display. For example, the offer coverage radius may include 2 km, in which case, the plurality of offers for services may be generated within a circular area defined by the 2 km offer coverage radius.

An offer generator 120 that is executed by at least one hardware processor (e.g., the hardware processor 702 of FIG. 7, and/or the hardware processor 904 of FIG. 9) is to generate, based on selection of an offer from the plurality of offers 114, a display of the selected offer 122 that includes a QR code, a barcode, and/or a Near Field Communication code.

An offer analyzer 124 that is executed by at least one hardware processor (e.g., the hardware processor 702 of FIG. 7, and/or the hardware processor 904 of FIG. 9) is to analyze, based on redeeming of the selected offer 122, the attribute 104 associated with user 106 relative to attributes 126 of other users 128. Further, the offer analyzer 124 is to modify the generation, based on the analysis of the attribute 104 associated with user 106 relative to attributes 126 of other users 128 and the location 110, of the plurality of offers 114 for the services on the map display 116 or the augmented reality display 118.

According to examples disclosed herein, the offer analyzer 124 may analyze, based on redeeming of the selected offer, the attribute associated with user relative to attributes of other users, and modify the generation, based on the analysis of the attribute associated with user relative to attributes of other users and the location, of the plurality of offers for the services on the map display or the augmented reality display by recording, into a blockchain, a transaction related to the redeeming of the selected offer. Further, the offer analyzer 124 may modify, based on the blockchain recorded transaction related to the redeeming of the selected offer, the generation, based on the analysis of the attribute associated with user relative to attributes of other users and the location, of the plurality of offers for the services on the map display or the augmented reality display.

According to examples disclosed herein, the offer analyzer 124 may analyze, based on redeeming of the selected offer, the attribute associated with user relative to attributes of other users, and modify the generation, based on the analysis of the attribute associated with user relative to attributes of other users and the location, of the plurality of offers for the services on the map display or the augmented reality display by determining, for the location, whether the attribute associated with the user does not match some of the attributes of the other users. For example, assuming that the attribute associated with the user includes a demographic that includes an age range of 20 to 25, and some of the attributes of the other users include a demographic that includes an age range of 35 to 40, the offer analyzer 124 may determine that the demographic attribute associated with the user does not match some of the demographic attributes of the other users. Further, the offer analyzer 124 may modify, based on a determination that the attribute associated with the user does not match some of the attributes of the other users, the generation of the plurality of offers for the services on the map display or the augmented reality display by proportionally increasing a number of offers for the services that match some of the attributes of the other users. In this regard, the overall number of offers for services may be proportionally increased to include offers related to the demographic attributes of the age range of 35 to 40, even though the demographic attribute associated with the user includes the age range of 20 to 25. For example, assuming that the overall number of offers for services includes 100 offers for services, where 10 offers are related to the demographic attribute associated with the user including the age range of 20 to 25, and 90 offers are related to the demographic attributes of users of the age range of 35 to 40, the overall number of offers for services for the demographic attribute associated with the user including the age range of 20 to 25 may be proportionally increased from 10 offers to 30 offers, where 20 offers are related to the demographic attributes of the age range of 35 to 40 (where the proportionality may be determined based on the total number of users related to the demographic attribute associated with the user including the age range of 20 to 25 and the demographic attributes of the age range of 35 to 40).

According to examples disclosed herein, the offer analyzer 124 may analyze, based on redeeming of the selected offer, the attribute associated with user relative to attributes of other users, and modify the generation, based on the analysis of the attribute associated with user relative to attributes of other users and the location, of the plurality of offers for the services on the map display or the augmented reality display by determining, for the location, whether the attribute associated with the user does not match any of the attributes of the other users. For example, assuming that the attribute associated with the user includes a demographic that includes an age range of 20 to 25, and this demographic attribute does not match any of the attributes of the other users, the offer analyzer 124 may determine that the demographic attribute associated with the user does not match any of the attribute of the other users. Further, the offer analyzer 124 may modify, based on a determination that the attribute associated with the user does not match any of the attributes of the other users, the generation of the plurality of offers for the services on the map display or the augmented reality display by proportionally increasing a number of offers for the services that match the attributes of the other users. In this regard, the overall number of offers for services may be proportionally increased to include offers related to the demographic attributes of the age range of 35 to 40 for the other users, even though the demographic attribute associated with the user includes the age range of 20 to 25.

With respect to modification of the plurality of offers 114 for the services on the map display 116 or the augmented reality display 118, the apparatus 100 (which may include certain functionality that may be implemented as a mobile application on a device such as a smartphone, a tablet, etc.) may provide for placement of offers or services from a merchant into a map that will be viewable by the users 128 including the user 106. The offer analyzer 124 may track the users' location locally with respect to the mobile application. A real time (e.g., configurable in seconds or minutes) push message may be pushed to the mobile application to notify the users 128 including the user 106 on a radius based location (e.g., configurable in miles or kilometers radius), and user attributes. The push message may notify users that an offer(s), or service(s), or promotion is available when parameters are matched. In this regard, the offer(s), service(s), or promotion(s) may include parameters based on user attributes such as gender, age range, and/or an industry group, etc., as well as the width scope of the radius (e.g., 2 km, 5 kms) from the location 110 of the user 106.

When the user 106 performs a transaction with respect to an offer by capturing an offer from the augmented reality display 118, redeeming an offer from the augmented reality display 118 and/or from the user's personal possession, and/or scanning a quick response (QR) code, BAR code, or near-field communication (NFC) to redeem an offer or promotion, the transaction may be recorded into a blockchain. With respect to the blockchain, the blockchain record may be immutable and with trust, where a user cannot deny that a certain transaction happens or did not happen, and in the same manner, the blockchain may be used to track if a specific offer or promotion is already used or claimed. The blockchain may utilize, for example, Ethereum-proof of seal to store a unique identifier and attributes of an offer or promotion. The proof-of-seal may be used to have the nodes (computers allowed/permissioned to vote) to validate a transaction. The unique identifier may be used to confirm that a promotion code will not be duplicated or claimed more than once.

The user 106 may use the mobile application to scan the QR/BAR code or use NFC to capture a valid offer or promotion code using, for example, their phone camera.

With respect to the transaction, a smart contract may be deployed into the blockchain that may be invoked upon the triggering of a transaction. A promotion or an offer may be treated as a contract between the merchant and the user (who has the promotion or offer). A smartcontract may represent an executable program the lives in the blockchain. A smart-contract may be established upon the capture of a promotion or offer, for example, from the augmented reality mode, and triggered or executed once claimed, thus completing the contract. The blockchain may provide for the deployment of smart contracts. For the blockchain, each transaction may be stored into the blockchain for veracity and trust of the offers and promotion. Further, the blockchain may provide for running on proof of seal (e.g., a validation from the nodes used). Nodes may represent computers/servers that are provided with permission to vote or validate a transaction, thus denoted proof-of-seal. A validation from the nodes may represent an event where every server will validate a transaction regardless of who the merchant is. For example, assuming that a promotion code is deployed by merchant ABC, and user John Doe was able to capture or get the promotion or offer from merchant ABC, John Doe may now claim the promotion in a merchant ABC store. Merchant ABC nodes/servers will not only validate the transaction, but also the other nodes such as merchant XYZ, merchant PQR, etc., will check the transaction to validate the transaction.

Figure 2:
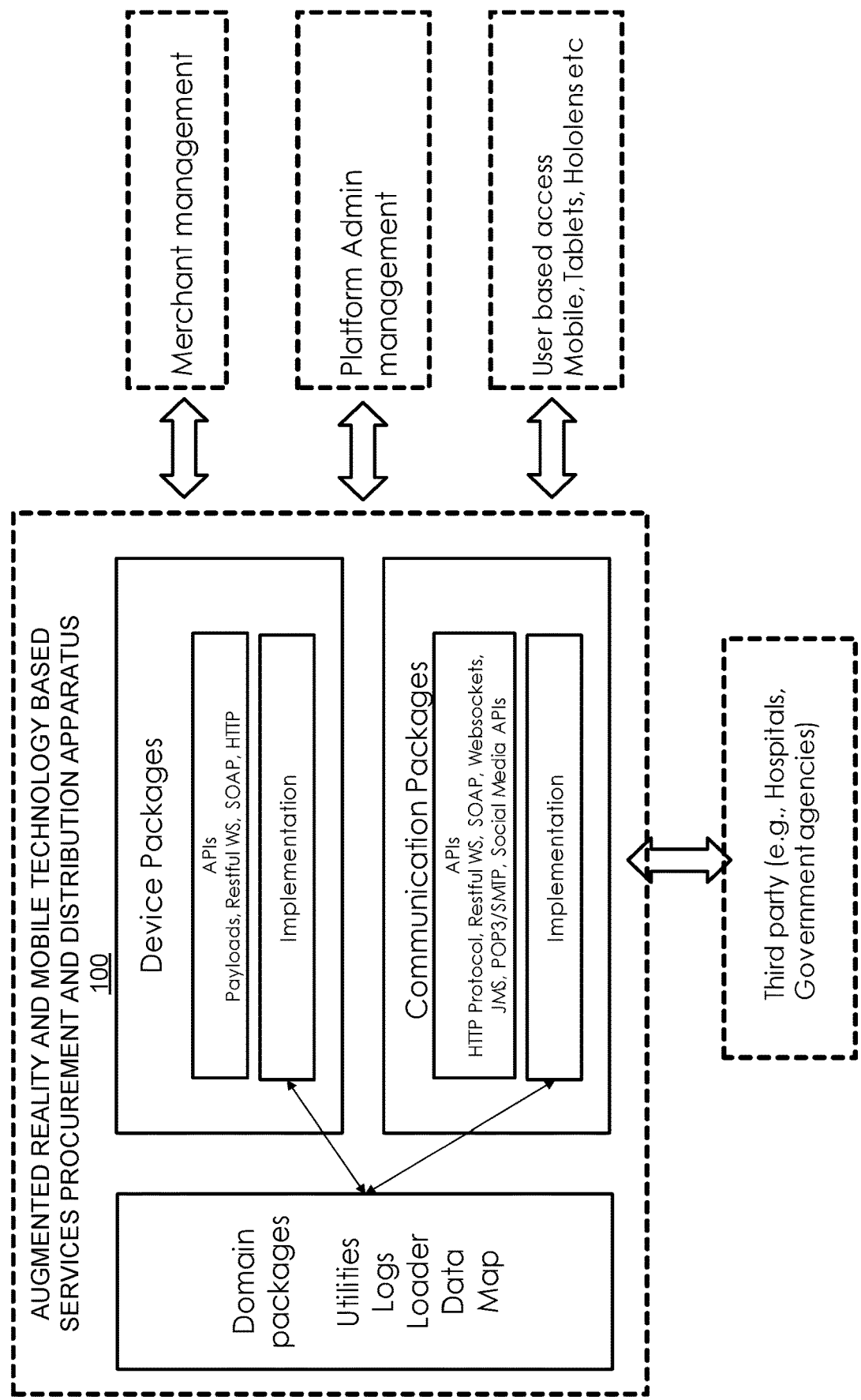
FIG. 2 illustrates a logical layout of the augmented reality and mobile technology based services procurement and distribution apparatus of FIG. 1 in accordance with an example of the present disclosure.

FIG. 2 illustrates a logical layout of the apparatus 100 in accordance with an example of the present disclosure.

Referring to FIG. 2, with respect to domain packages, the domain packages may include utilities, logs, loader, data, and map. The utilities may represent logic related to a user. The logs may represent log-in activity with respect to the user. The loader may represent loading of entities (e.g., users, service providers, etc.). The data may represent data management using, for example, a relational database and/or data analytics. The maps may represent a type of map being used (e.g., GOOGLE MAPS™, etc.).

The device packages may include packages that are being deployed on a mobile device. The application programming interfaces (APIs) may be implemented to communicate directly with the domain packages (e.g., user data, user profile data, data for rendering a map, etc.).

The communication packages may provide for communication (e.g., e-mail, notification to the application, etc.) with the domain packages. For example, third parties (e.g., hospitals, government agencies) may communicate with the user 106 to provide notifications and alerts. The communication packages may also provide for communication of offers to the user 106.

Merchant management may provide for management of attributes related to a service provider (e.g., a merchant, an organization, etc.). Merchant management may provide for management of offers that are presented to a user, the specifics of the offers, the contract between the user 106 and a service provider with respect to selection (e.g., acceptance) of an offer, etc.

Platform administrative management may provide for management of administrative control with respect to the apparatus 100 (e.g., adding/removing a new service provider, a new user, etc.)

User based access including mobile, tablets, HoloLens, etc., may provide for control of access by a particular user to a set of offers via a specific type of device. For example, different types of devices may include mobile devices, tablets, etc.

FIGS. 3-6 illustrate a process flow to illustrate operation of the apparatus 100 in accordance with an example of the present disclosure.

Figure 3:
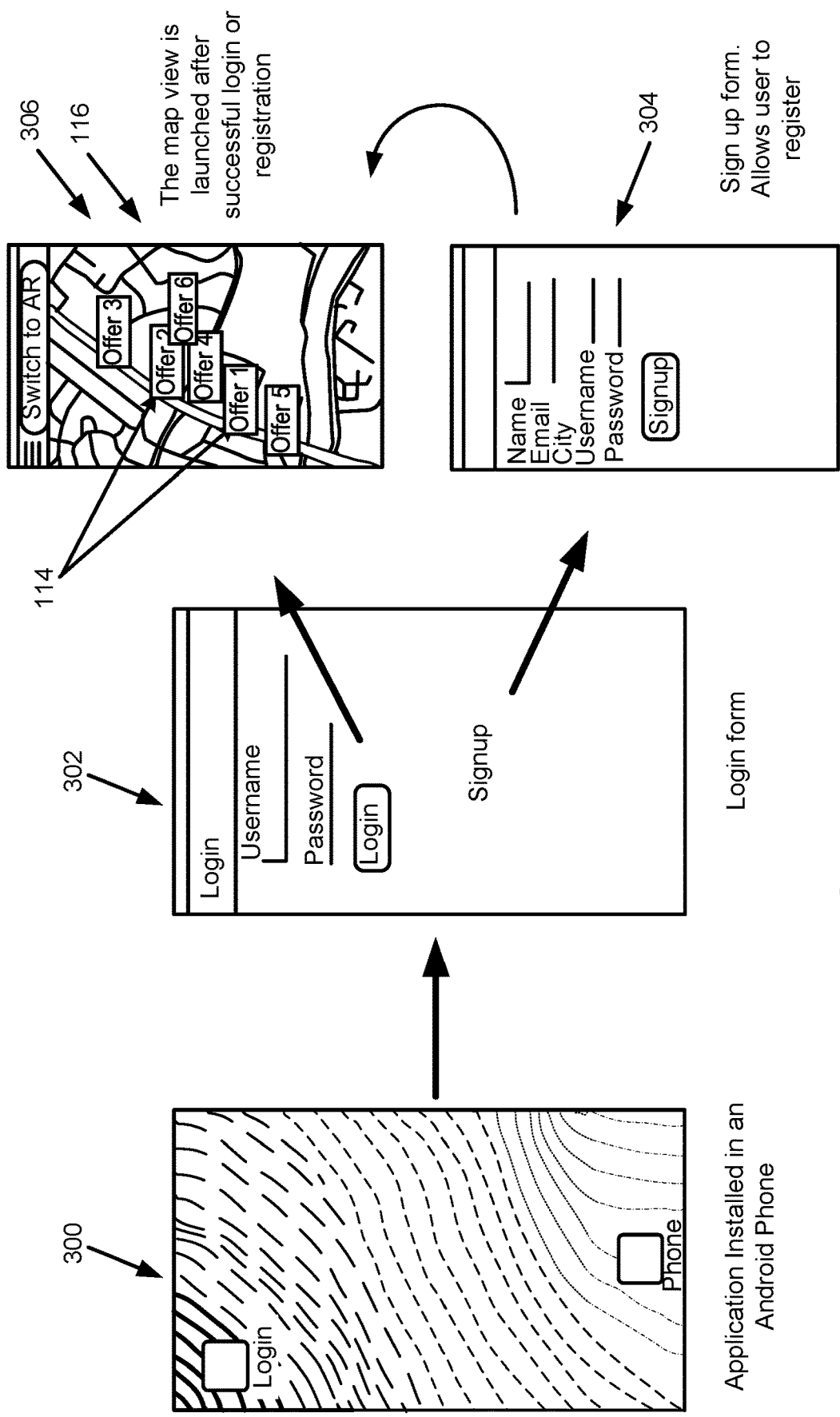
FIGS. 3-6 illustrate a process flow to illustrate operation of the augmented reality and mobile technology based services procurement and distribution apparatus of FIG. 1 in accordance with an example of the present disclosure.

Referring to FIG. 3, at 300, an application form of the apparatus 100 may be installed, for example, on a phone such as an ANDROID™ phone. At 302, the user 106 may log onto the application using a username and password. At 304, the user 106 may register if not already registered. At 306, the services generator 112 may generate, based on the ascertained attribute 104 and location 110, a plurality of offers 114 for services on the map display 116 (or the augmented reality display 118 as shown in FIG. 6).

Figure 4:
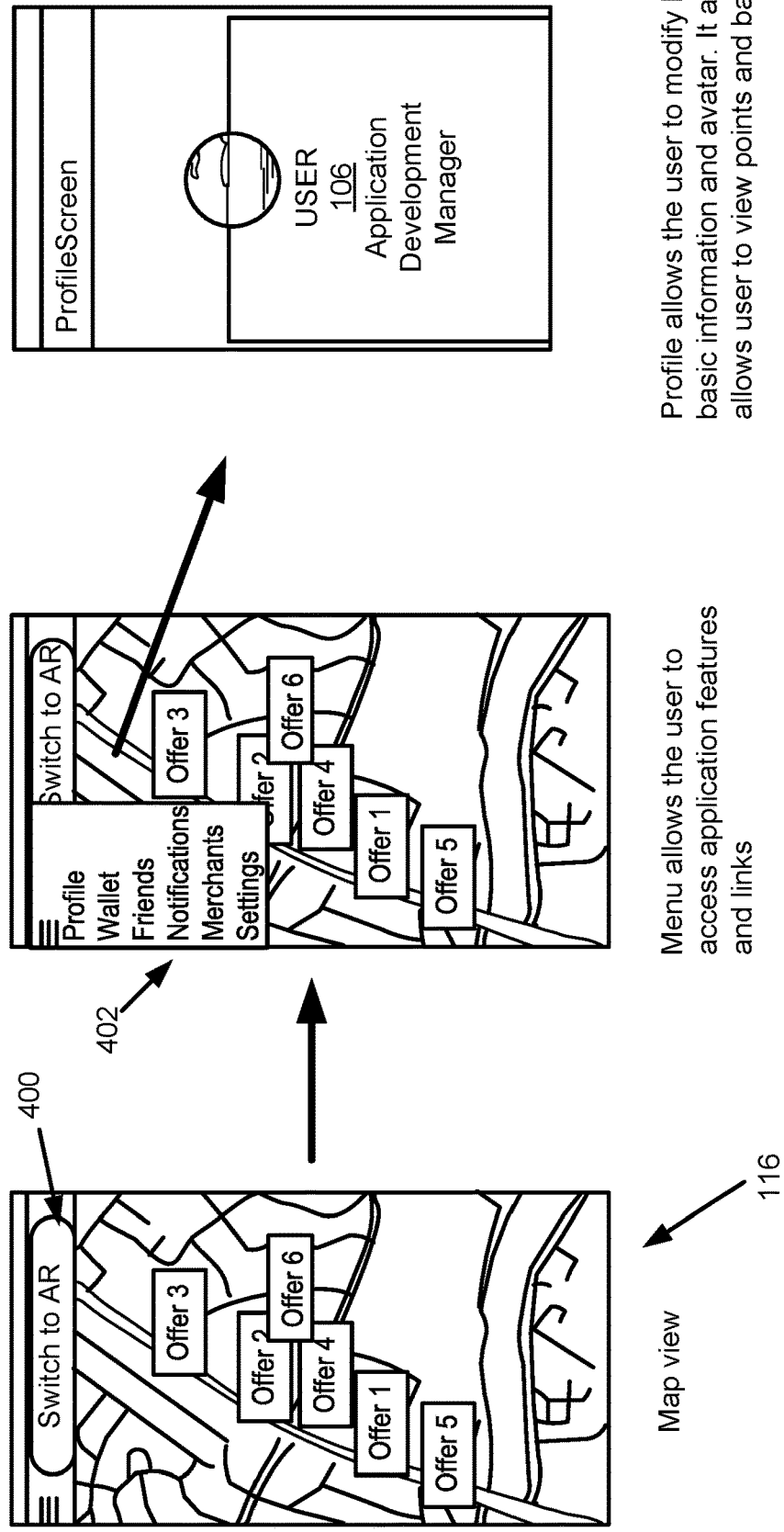

Referring to FIG. 4, the map display 116 may include a plurality of the offers 114, and an option at 400 to switch to the augmented reality display 118. At 402, a menu may be displayed and include options of profile, wallet, friends, notifications, merchants, and settings. The profile may include the attributes of the user 106 such as the user name, address, age, gender, occupation, etc. The wallet may include a set of the selected offers (e.g., see FIG. 5). The friends may include other users associated with the user as friends (or otherwise linked to the user), where attributes of such other users may be used by the offer analyzer 124 as disclosed herein. The notifications may include any alerts (e.g., special offers, etc.) for the user 106. Merchants may include information related to entities that are providing the offers 114 for services. Settings may allow the user to change various options such as display options, notifications, etc.

Figure 5:
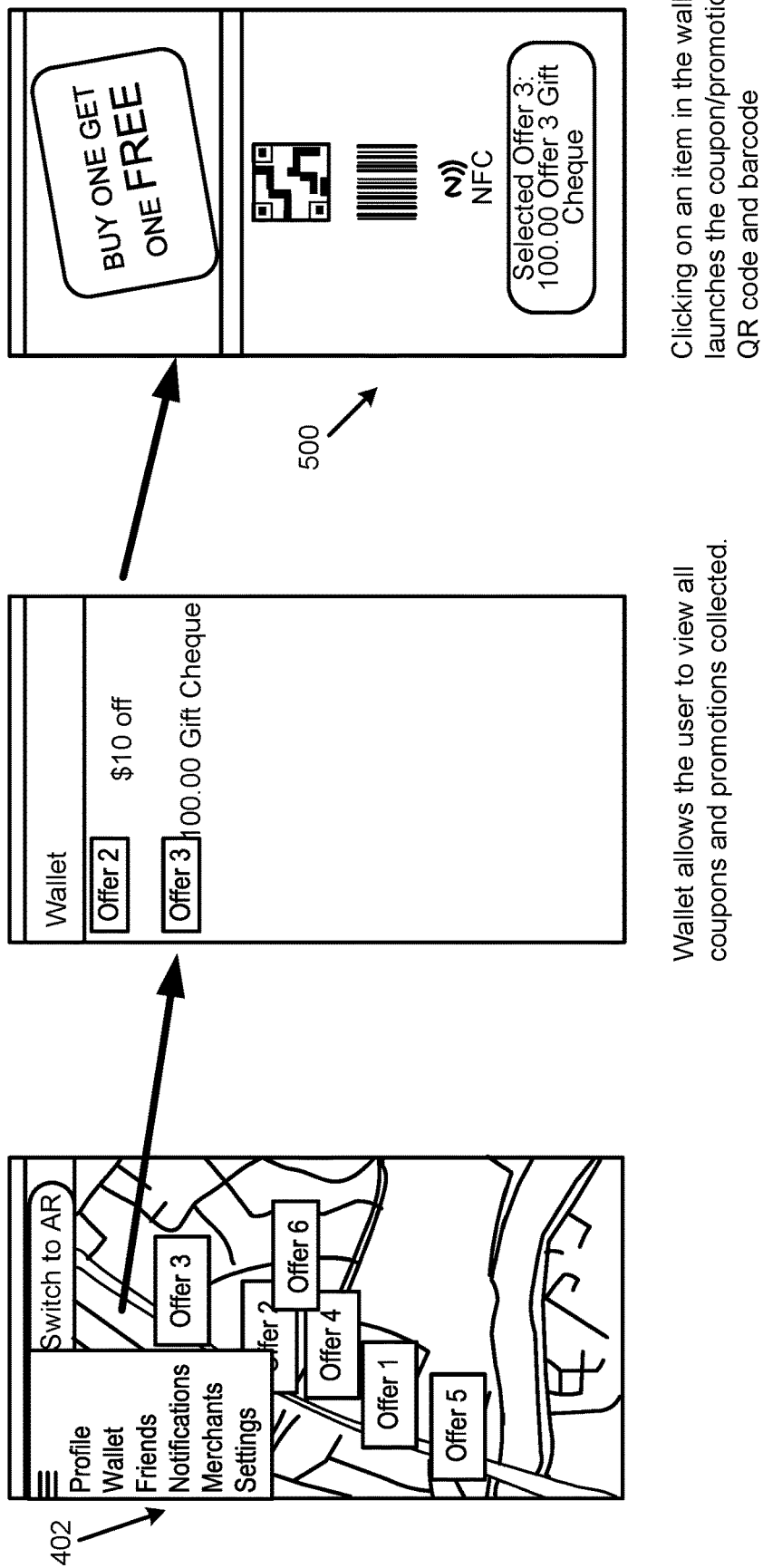

Referring to FIG. 5, when the user 106 selects the wallet option from the menu 402, a set of the selected offers may be displayed. In this regard, as shown at 500, the offer generator 120 may generate, based on selection of an offer from the plurality of offers 114 (e.g., one of the offers displayed in the wallet), a display of the selected offer 122 that includes a QR code, a barcode, and/or a Near Field Communication code.

Figure 6:
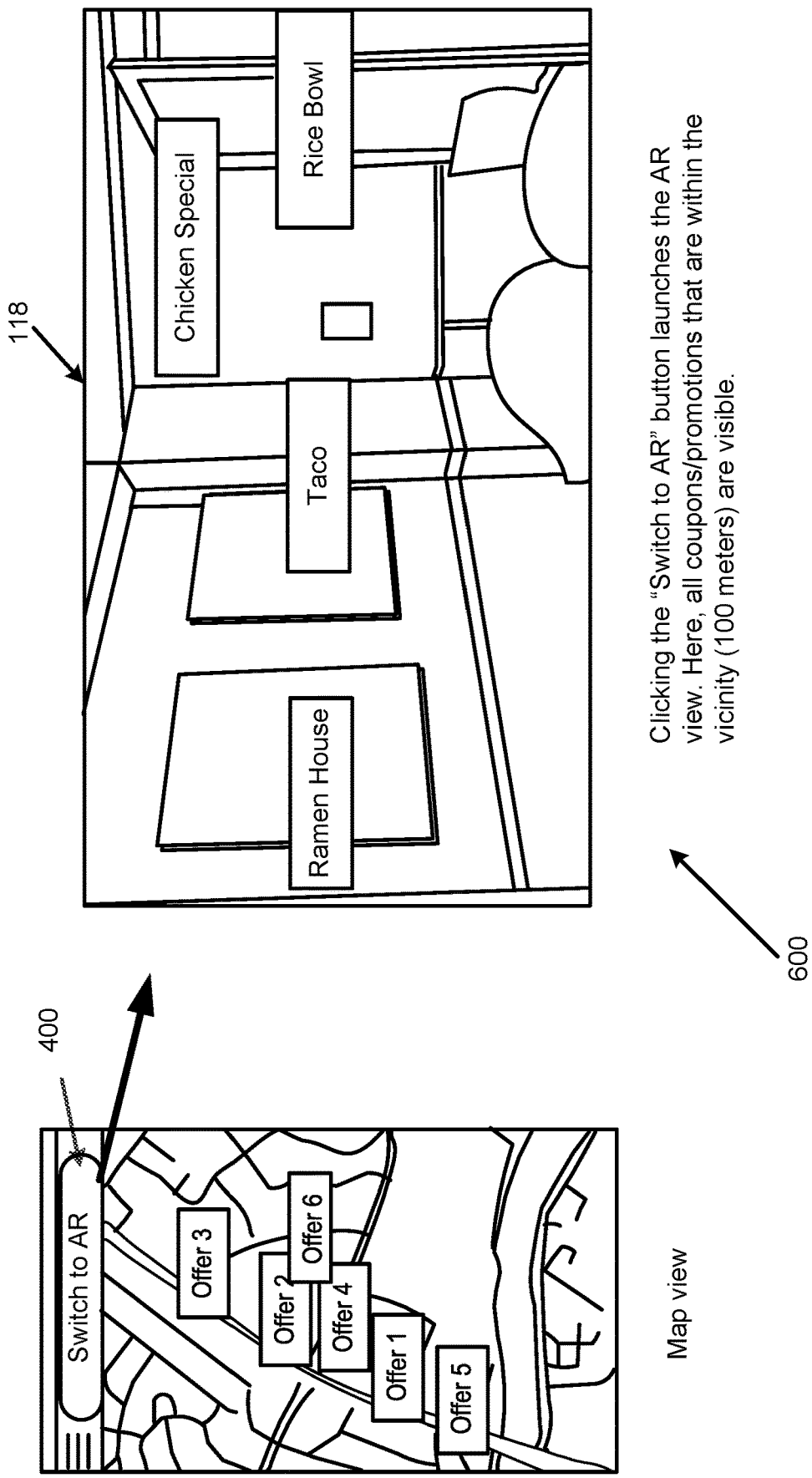

Referring to FIG. 6, when the user 106 actuates the "SWITCH TO AR" option at 400, the augmented reality display 118 may be displayed at 600. In this regard, the augmented reality display 118 may include offers that are within a specified distance of the location 110 of the user 106. For example, the specified distance may be 100 meters.

Figure 7:
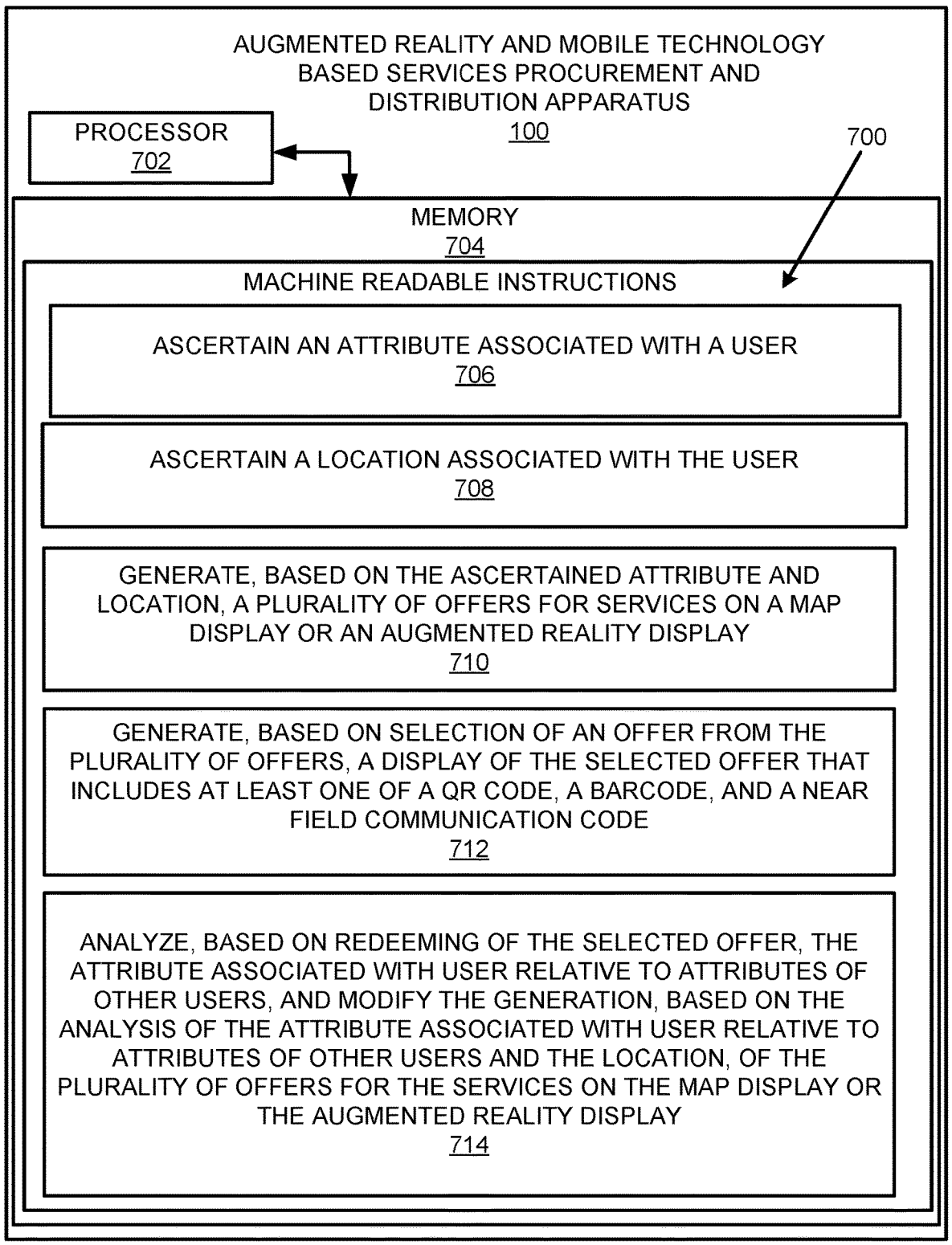
FIG. 7 illustrates an example block diagram for augmented reality and mobile technology based services procurement and distribution in accordance with an example of the present disclosure.
Figure 8:
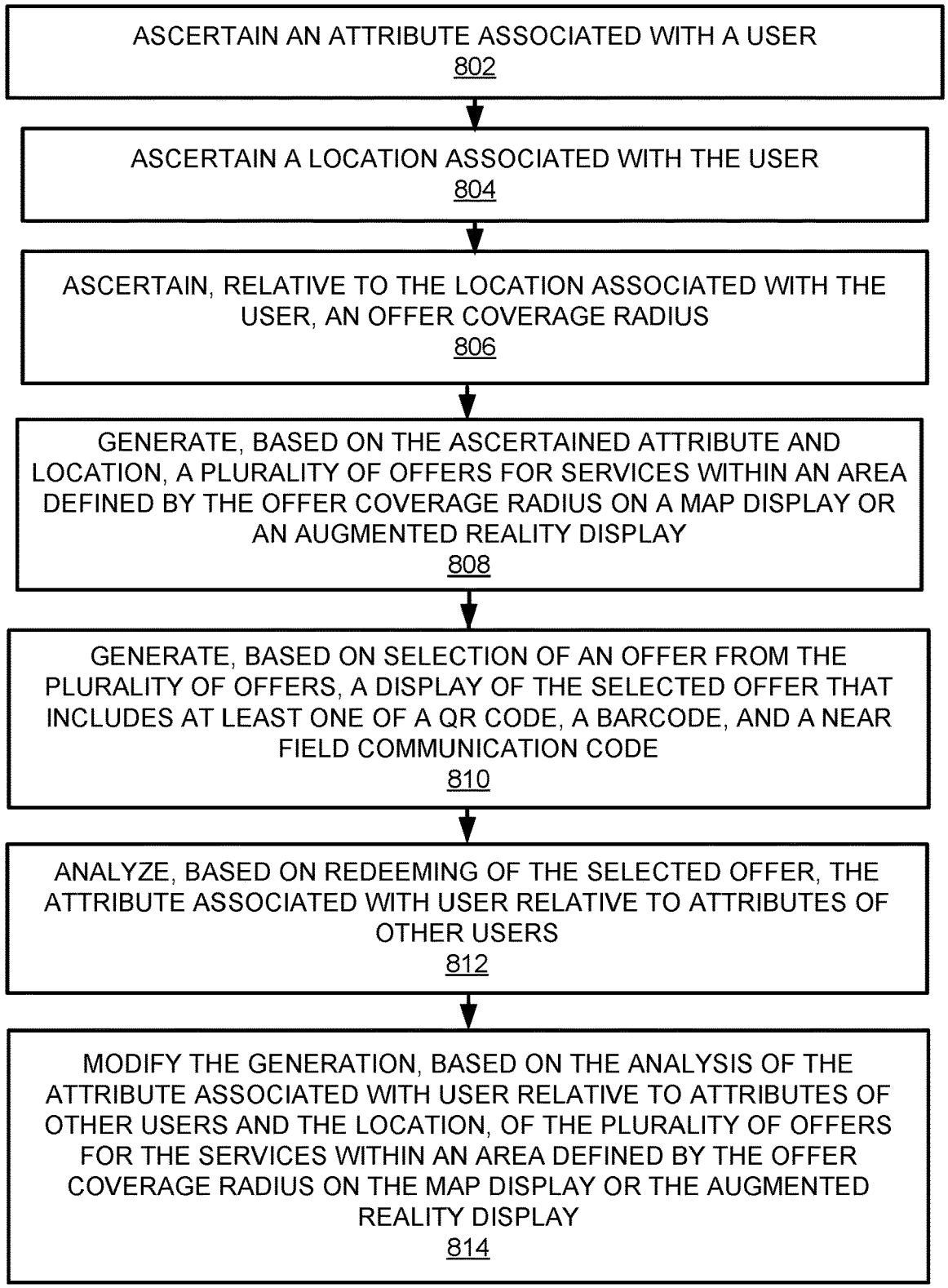
FIG. 8 illustrates a flowchart of an example method for augmented reality and mobile technology based services procurement and distribution in accordance with an example of the present disclosure.
Figure 9:
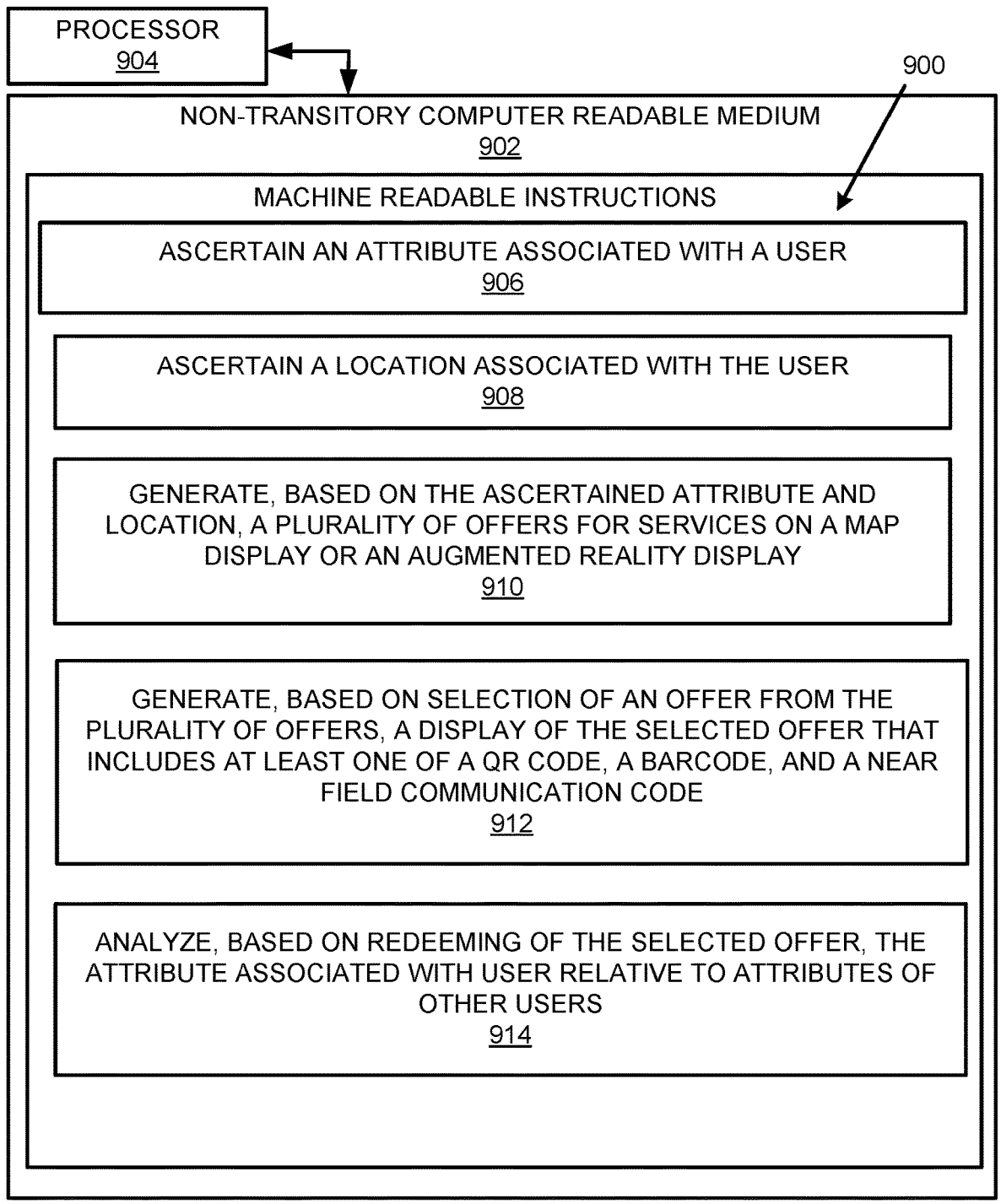
FIG. 9 illustrates a further example block diagram for augmented reality and mobile technology based services procurement and distribution in accordance with another example of the present disclosure.
Figure 9:
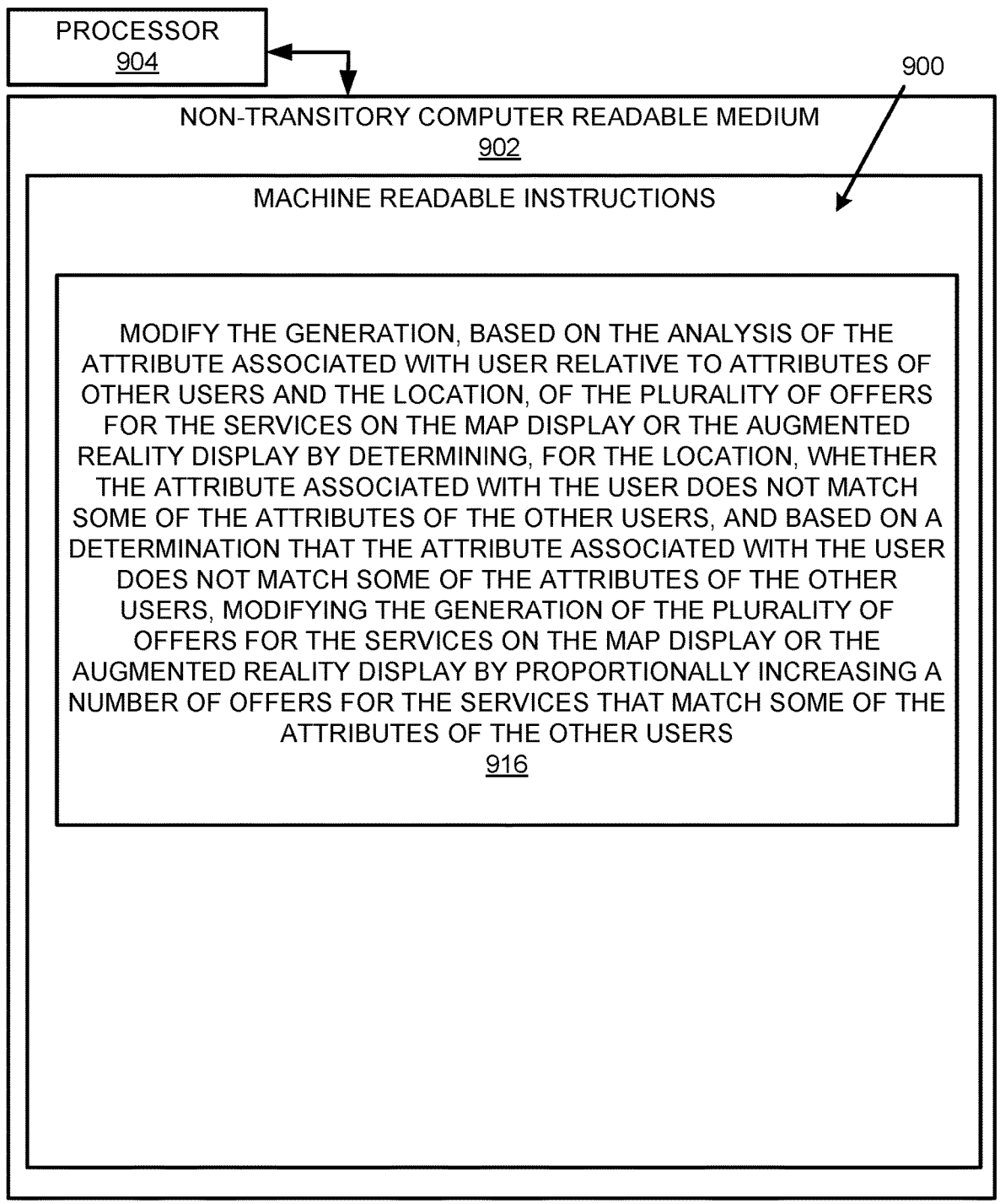

FIGS. 7-9 respectively illustrate an example block diagram 700, a flowchart of an example method 800, and a further example block diagram 900 for augmented reality and mobile technology based services procurement and distribution, according to examples. The block diagram 700, the method 800, and the block diagram 900 may be implemented on the apparatus 100 described above with reference to FIG. 1 by way of example and not of limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent an example method for augmented reality and mobile technology based services procurement and distribution, and the steps of the method. FIG. 9 may represent a non-transitory computer readable medium 902 having stored thereon machine readable instructions to provide augmented reality and mobile technology based services procurement and distribution according to an example. The machine readable instructions, when executed, cause a processor 904 to perform the instructions of the block diagram 900 also shown in FIG. 9.

The processor 902 of FIG. 9 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to ascertain an attribute associated with a user.

The processor 702 may fetch, decode, and execute the instructions 708 to ascertain a location associated with the user.

The processor 702 may fetch, decode, and execute the instructions 710 to generate, based on the ascertained attribute and location, a plurality of offers for services on a map display or an augmented reality display.

The processor 702 may fetch, decode, and execute the instructions 712 to generate, based on selection of an offer from the plurality of offers, a display of the selected offer that includes at least one of a QR code, a barcode, and a Near Field Communication code.

The processor 702 may fetch, decode, and execute the instructions 714 to analyze, based on redeeming of the selected offer, the attribute associated with user relative to attributes of other users, and modify the generation, based on the analysis of the attribute associated with user relative to attributes of other users and the location, of the plurality of offers for the services on the map display or the augmented reality display.

Referring to FIGS. 1-6 and 8, and particularly FIG. 8, for the method 800, at block 802, the method may include ascertaining an attribute associated with a user.

At block 804, the method may include ascertaining a location associated with the user.

At block 806, the method may include ascertaining, relative to the location associated with the user, an offer coverage radius.

At block 808, the method may include generating, based on the ascertained attribute and location, a plurality of offers for services within an area defined by the offer coverage radius on a map display or an augmented reality display.

At block 810, the method may include generating, based on selection of an offer from the plurality of offers, a display of the selected offer that includes at least one of a QR code, a barcode, and a Near Field Communication code.

At block 812, the method may include analyzing, based on redeeming of the selected offer, the attribute associated with user relative to attributes of other users.

At block 814, the method may include modifying the generation, based on the analysis of the attribute associated with user relative to attributes of other users and the location, of the plurality of offers for the services within an area defined by the offer coverage radius on the map display or the augmented reality display.

Referring to FIGS. 1-4 and 9, and particularly FIG. 9, for the block diagram 900, the non-transitory computer readable medium 902 may include instructions 906 to ascertain an attribute associated with a user.

The processor 904 may fetch, decode, and execute the instructions 908 to ascertain a location associated with the user.

The processor 904 may fetch, decode, and execute the instructions 910 to generate, based on the ascertained attribute and location, a plurality of offers for services on a map display or an augmented reality display.

The processor 904 may fetch, decode, and execute the instructions 912 to generate, based on selection of an offer from the plurality of offers, a display of the selected offer that includes at least one of a QR code, a barcode, and a Near Field Communication code.

The processor 904 may fetch, decode, and execute the instructions 914 to analyze, based on redeeming of the selected offer, the attribute associated with user relative to attributes of other users.

The processor 904 may fetch, decode, and execute the instructions 916 to modify the generation, based on the analysis of the attribute associated with user relative to attributes of other users and the location, of the plurality of offers for the services on the map display or the augmented reality display by determining, for the location, whether the attribute associated with the user does not match some of the attributes of the other users, and based on a determination that the attribute associated with the user does not match some of the attributes of the other users, modifying the generation of the plurality of offers for the services on the map display or the augmented reality display by proportionally increasing a number of offers for the services that match some of the attributes of the other users.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An augmented reality and mobile technology based services procurement and distribution apparatus comprising:
   a user attribute analyzer, executed by at least one hardware processor, to ascertain an attribute associated with a user;
   a user location analyzer, executed by the at least one hardware processor, to ascertain a location associated with the user;
   a services generator, executed by the at least one hardware processor, to
   generate, based on the ascertained attribute and location, a plurality of offers for services on a map display or an augmented reality display, wherein the attribute associated with the user includes an activity level of the user from a plurality of activity levels related to at least one of selection or redemption of offers within a specified time duration, and wherein the plurality of activity levels includes greater than two activity levels;
   compare, for each activity level of the plurality of activity levels, an activity time duration associated with the user to activity time duration thresholds associated with respective ones of the plurality of activity levels,
   identify, based on the comparison of the activity time duration associated with the user to activity time duration thresholds associated with respective ones of the plurality of activity levels, the activity level associated with the user that represents a highest activity level associated with the user that corresponds to a shortest activity time duration associated with the user,
   determine, based on the activity level associated with the user, a particular offer for the user, and
   generate, based on the ascertained attribute and location, the plurality of offers for services, including the particular offer, on the map display or the augmented reality display;
   an offer generator, executed by the at least one hardware processor, to
   generate, based on selection of an offer from the plurality of offers, a display of the selected offer that includes at least one of a QR code, a barcode, or a Near Field Communication code; and
   an offer analyzer, executed by the at least one hardware processor, to
   analyze, based on redeeming of the selected offer by utilization of the at least one of the QR code, the barcode, or the Near Field Communication code by a smart device, the attribute associated with user relative to attributes of other users, and
   modify the generation by proportionally increasing, based on the analysis of the attribute associated with user relative to attributes of other users and the location, the plurality of offers for the services on the map display or the augmented reality display.

2. The augmented reality and mobile technology based services procurement and distribution apparatus according to claim 1, wherein the attribute associated with the user further includes a gender of the user.

3. The augmented reality and mobile technology based services procurement and distribution apparatus according to claim 1, wherein the attribute associated with the user further includes an offer status level of the user from a plurality of offer status levels related to at least one of selection or redemption of offers, and wherein the services generator is executed by the at least one hardware processor to generate, based on the ascertained attribute and location, the plurality of offers for services on the map display or the augmented reality display by:
   determining, based on the offer status level of the user, a further particular offer for the user; and
   generating, based on the ascertained attribute and location, the plurality of offers for services, including the further particular oiler, on the map display or the augmented reality display.

4. The augmented reality and mobile technology based services procurement and distribution apparatus according to claim 1, wherein the attribute associated with the user further includes a number of offer status level points associated with the user, and wherein the services generator is executed by the at least one hardware processor to generate, based on the ascertained attribute and location, the plurality of offers for services on the map display or the augmented reality display by:
   comparing, for each offer status level of a plurality of offer status levels, the number of offer status level points associated with the user to offer status point thresholds associated with respective ones of the plurality of offer status levels;
   identifying, based on the comparison of the number of offer status level points associated with the user to offer status point thresholds associated with respective ones of the plurality of offer status levels related to at least one of selection or redemption of offers, an offer status level associated with the user;
   determining, based on the offer status level associated with the user, a further particular offer for the user; and generating, based on the ascertained attribute and location, the plurality of offers for services, including the further particular offer, on the map display or the augmented reality display.

5. The augmented reality and mobile technology based services procurement and distribution apparatus according to claim 1, wherein the services generator is executed by the at least one hardware processor to generate, based on the ascertained attribute and location, the plurality of offers for services on the map display or the augmented reality display by:
ascertaining, relative to the location associated with the user, an offer coverage radius; and
generating, based on the ascertained attribute and location, the plurality of offers for services within an area defined by the offer coverage radius on the map display or the augmented reality display.

6. The augmented reality and mobile technology based services procurement and distribution apparatus according to claim 1, wherein the offer analyzer is executed by the at least one hardware processor to analyze, based on redeeming of the selected offer, the attribute associated with user relative to attributes of other users, and modify the generation, based on the analysis of the attribute associated with user relative to attributes of other users and the location of the plurality of offers for the services on the map display or the augmented reality display by:
recording, into a blockchain, a transaction related to the redeeming of the selected offer; and
modifying, based on the blockchain recorded transaction related to the redeeming of the selected offer, the generation, based on the analysis of the attribute associated with user relative to attributes of other users and the location, of the plurality of offers for the services on the map display or the augmented reality display.

7. The augmented reality and mobile technology based services procurement and distribution apparatus according to claim 1, wherein the offer analyzer is executed by the at least one hardware processor to analyze, based on redeeming of the selected offer, the attribute associated with user relative to attributes of other users, and modify the generation, based on the analysis of the attribute associated with user relative to attributes of other users and the location, of the plurality of offers for the services on the map display or the augmented reality display by:
determining, for the location, whether the attribute associated with the user does not match some of the attributes of the other users; and
based on a determination that the attribute associated with the user does not match some of the attributes of the other users, modifying the generation of the plurality of offers for the services on the map display or the augmented reality display by proportionally increasing, based on a number of the other users related to the attribute associated with the user, a number of offers for the services that match some of the attributes of the other users.

8. The augmented reality and mobile technology based services procurement and distribution apparatus according to claim 1, wherein the offer analyzer is executed by the at least one hardware processor to analyze, based on redeeming of the selected offer, the attribute associated with user relative to attributes of other users, and modify the generation, based on the analysis of the attribute associated with user relative to attributes of other users and the location, of the plurality of offers for the services on the map display or the augmented reality display by:
determining, for the location, whether the attribute associated with the user does not match any of the attributes of the other users; and
based on a determination that the attribute associated with the user does not match any of the attributes of the other users, modifying the generation of the plurality of offers for the services on the map display or the augmented reality display by proportionally increasing a number of offers for the services that match the attributes of the other users.

9. A method for augmented reality and mobile technology based services procurement and distribution comprising:
ascertaining, by at least one hardware processor, an attribute associated with a user;
ascertaining, by the at least one hardware processor, a location associated with the user;
ascertaining, by the at least one hardware processor and relative to the location associated with the user, an offer coverage radius;
generating, by the at least one hardware processor and based on the ascertained attribute and location, a plurality of offers for services within an area defined by the offer coverage radius on a map display or an augmented reality display wherein the attribute associated with the user includes an activity level of the user from a plurality of activity levels related to at least one of selection or redemption of offers within a specified time duration, and wherein the plurality of activity levels includes greater than two activity levels;
comparing, by the at least one hardware processor, for each activity level of the plurality of activity levels, an activity time duration associated with the user to activity time duration thresholds associated with respective ones of the plurality of activity levels;
identifying, by the at least one hardware processor, based on the comparison of the activity time duration associated with the user to activity time duration thresholds associated with respective ones of the plurality of activity levels, the activity level associated with the user that represents a highest activity level associated with the user that corresponds to a shortest activity time duration associated with the user;
determining, by the at least one hardware processor, based on the activity level associated with the user, a particular offer for the user;
generating, by the at least one hardware processor based on the ascertained attribute and location, the plurality of offers for services, including the particular otter, on the map display or the augmented reality display;
generating, by the at least one hardware processor and based on selection of an offer from the plurality of offers, a display of the selected offer that includes at least one of a QR code, a barcode, or a Near Field Communication code;
analyzing, by the at least one hardware processor and based on redeeming of the selected offer by utilization of the at least one of the QR code, the barcode, or the Near Field Communication code by a smart device, the attribute associated with user relative to attributes of other users; and
modifying, by the at least one hardware processor, the generation by proportionally increasing, based on the analysis of the attribute associated with user relative to attributes of other users and the location, the plurality of offers for the services on the map display or the augmented reality display.

10. The method according to claim 9, wherein the attribute associated with the user includes an offer status level of the user from a plurality of offer status levels related to at least one of selection or redemption of offers, and wherein generating, based on the ascertained attribute and location, the plurality of offers for services within the area defined by the offer coverage radius on the map display or the augmented reality display further comprises:
determining, based on the offer status level of the user, a particular offer for the user; and
generating, based on the ascertained attribute and location, the plurality of offers for services, including the particular oiler, within the area defined by the offer coverage radius on the map display or the augmented reality display.

11. The method according to claim 9, wherein the attribute associated with the user includes a number of offer status level points associated with the user, and wherein generating, based on the ascertained attribute and location, the plurality of offers for services within the area defined by the offer coverage radius on the map display or the augmented reality display further comprises:
comparing, for each offer status level of a plurality of offer status levels, the number of offer status level points associated with the user to offer status point thresholds associated with respective ones of the plurality of offer status levels;
identifying, based on the comparison of the number of offer status level points associated with the user to offer status point thresholds associated with respective ones of the plurality of offer status levels related to at least one of selection or redemption of offers, an offer status level associated with the user;
determining, based on the offer status level associated with the user, a particular offer for the user; and
generating, based on the ascertained attribute and location, the plurality of otters for services, including the particular offer, within the area defined by the offer coverage radius on the map display or the augmented reality display.

12. A non-transitory computer readable medium having stored thereon machine readable instructions, the machine readable instructions, when executed by at least one hardware processor, cause the at least one hardware processor to:
ascertain an attribute associated with a user;
ascertain a location associated with the user;
generate, based on the ascertained attribute and location, a plurality of offers for services on a map display or an augmented reality display, wherein the attribute associated with the user includes an activity level of the user from a plurality of activity levels related to at least one of selection or redemption of offers within a specified time duration, and wherein the plurality of activity levels includes greater than two activity levels;
compare, for each activity level of the plurality of activity levels an activity time duration associated with the user to activity time duration thresholds associated with respective ones of the plurality of activity levels;
identify, based on the comparison of the activity time duration associated with the user to activity time duration thresholds associated with respective ones of the plurality of activity levels, the activity level associated with the user that represents a highest activity level associated with the user that corresponds to a shortest activity time duration associated with the user;
determine, based on the activity level associated with the user, a particular offer for the user;
generate, based on the ascertained attribute and location, the plurality of offers for services, including the particular offer, on the map display or the augmented reality display;
generate, based on selection of an offer from the plurality of offers, a display of the selected offer that includes at least one of a QR code, a barcode, or a Near Field Communication code;
analyze, based on redeeming of the selected offer by utilization of the at least one of the QR code, the barcode, or the Near Field Communication code by a smart device, the attribute associated with user relative to attributes of other users; and
modify the generation by proportionally increasing, based on the analysis of the attribute associated with user relative to attributes of other users and the location, of the plurality of offers for the services on the map display or the augmented reality display by
determining, for the location, whether the attribute associated with the user does not match some of the attributes of the other users, and
based on a determination that the attribute associated with the user does not match some of the attributes of the other users, modifying the generation of the plurality of offers for the services on the map display or the augmented reality display by proportionally increasing a number of offers for the services that match some of the attributes of the other users.

13. The non-transitory computer readable medium according to claim 12, wherein the machine readable instructions to generate, based on the ascertained attribute and location, the plurality of offers for services on the map display or the augmented reality display, when executed by at least one hardware processor, further cause the at least one hardware processor to:
ascertain, relative to the location associated with the user, an offer coverage radius; and
generate, based on the ascertained attribute and location, the plurality of offers for services within an area defined by the offer coverage radius on the map display or the augmented reality display.

14. The non-transitory computer readable medium according to claim 12, wherein the machine readable instructions to analyze, based on redeeming of the selected offer, the attribute associated with user relative to attributes of other users, and modify the generation, based on the analysis of the attribute associated with user relative to attributes of other users and the location, of the plurality of offers for the services on the map display or the augmented reality display, when executed by at least one hardware processor, further cause the at least one hardware processor to:
record, into a blockchain, a transaction related to the redeeming of the selected offer; and
modify, based on the blockchain recorded transaction related to the redeeming of the selected offer, the generation, based on the analysis of the attribute associated with user relative to attributes of other users and the location, of the plurality of offers for the services on the map display or the augmented reality display.

* * * * *